United States Patent [19]
Reitz

[11] Patent Number: 5,662,066
[45] Date of Patent: Sep. 2, 1997

[54] AUTOMATIC CAT LITTER DEVICE AND METHOD

[76] Inventor: Donald D. Reitz, 8665 Lamar Dr., Arvada, Colo. 80003

[21] Appl. No.: 608,273

[22] Filed: Feb. 28, 1996

[51] Int. Cl.$^6$ ................................................ A01K 29/00
[52] U.S. Cl. ............................................................ 119/163
[58] Field of Search .................................. 119/163, 165, 119/166, 168

[56] References Cited

U.S. PATENT DOCUMENTS

| | | | |
|---|---|---|---|
| 4,120,264 | 10/1978 | Carter | 119/166 |
| 4,846,104 | 7/1989 | Pierson, Jr. | 119/166 |
| 5,048,464 | 9/1991 | Shirley | 119/166 |
| 5,107,797 | 4/1992 | La Rouche | 119/163 X |

OTHER PUBLICATIONS

Advertisement for "LitterMaid", p. 71, *World Traveler*, Jan. 1996.
Advertisement for "LitterMaid", pp. 49, *The Sharper Image Catalog*, Holiday 1995.

*Primary Examiner*—Thomas Price
*Attorney, Agent, or Firm*—Robert G. Crouch; Chrisman, Bynum & Johnson

[57] ABSTRACT

A cat litter device includes a rotatable chamber supported by a support base and has a motor mounted on the support base for rotating the rotatable chamber. The rotatable chamber includes a pair of openings, the first opening being suitable for ingress and egress of the animal, and the second opening being suitable for selective disposal of the waste material therethrough. The chamber includes a septum in the interior thereof which is attached to the chamber to form an inner compartment within the chamber. The inner compartment has an opening therein to place the compartment in fluid communication with the chamber, with the opening being selectively covered with a screen which is pivotally mounted to the septum. When the controller associated with the device detects a presence signal from a motion sensor, the motor can be provided with a signal to rotate the chamber in a first direction sufficient to allow the litter to enter the inner compartment through the screen and filter out the waste material which slides along the screen and septum and is directed out of the second opening. The controller then reverses the direction of the motor and rotates the chamber back so that the litter returns to the original position in the chamber.

24 Claims, 11 Drawing Sheets

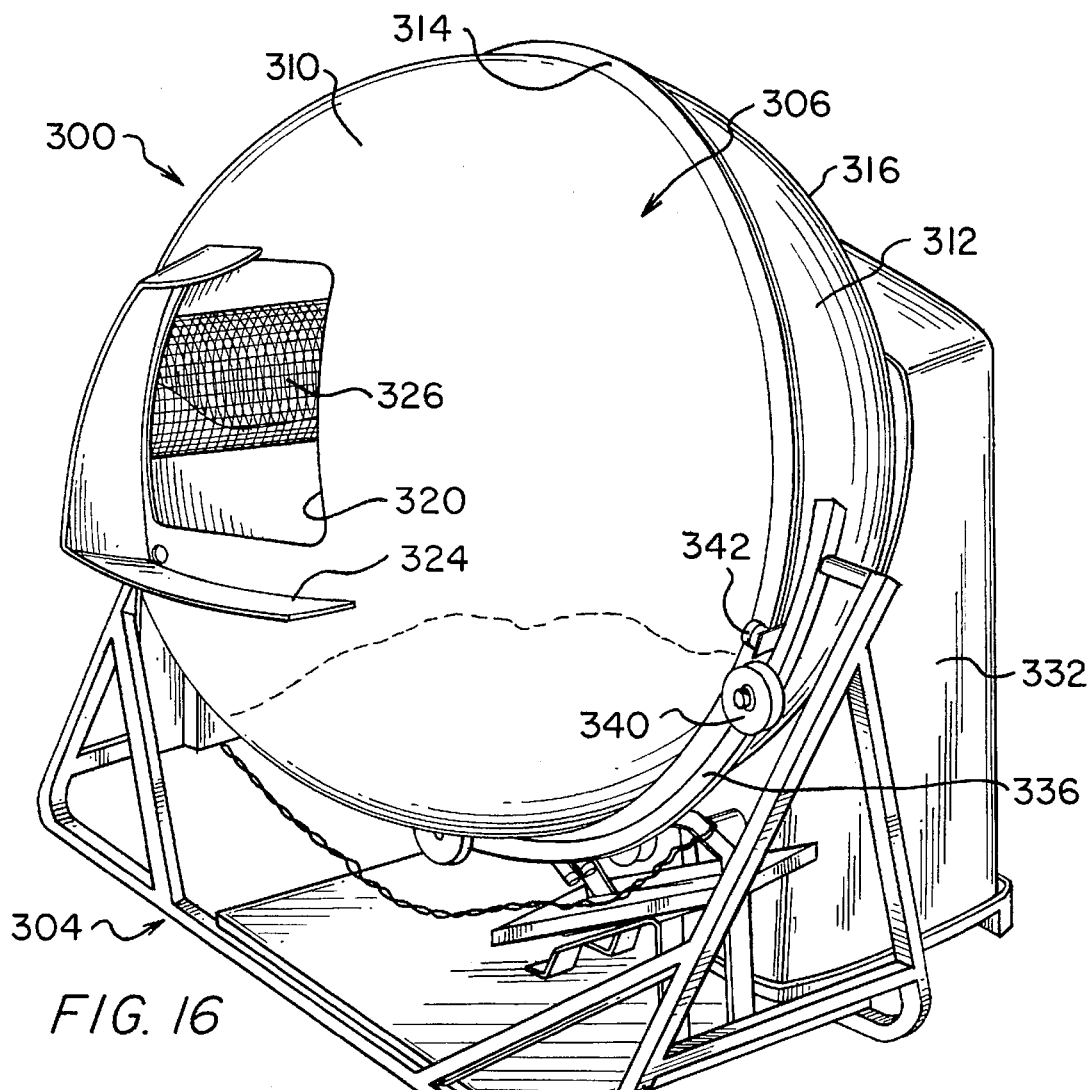
FIG. 16
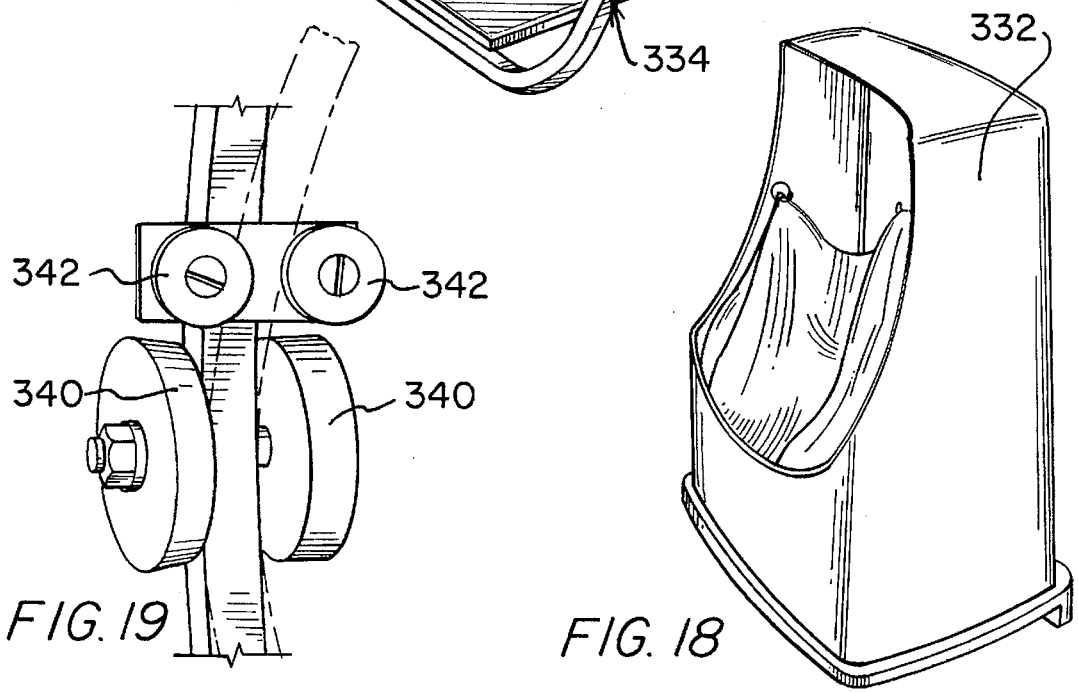
FIG. 19
FIG. 18

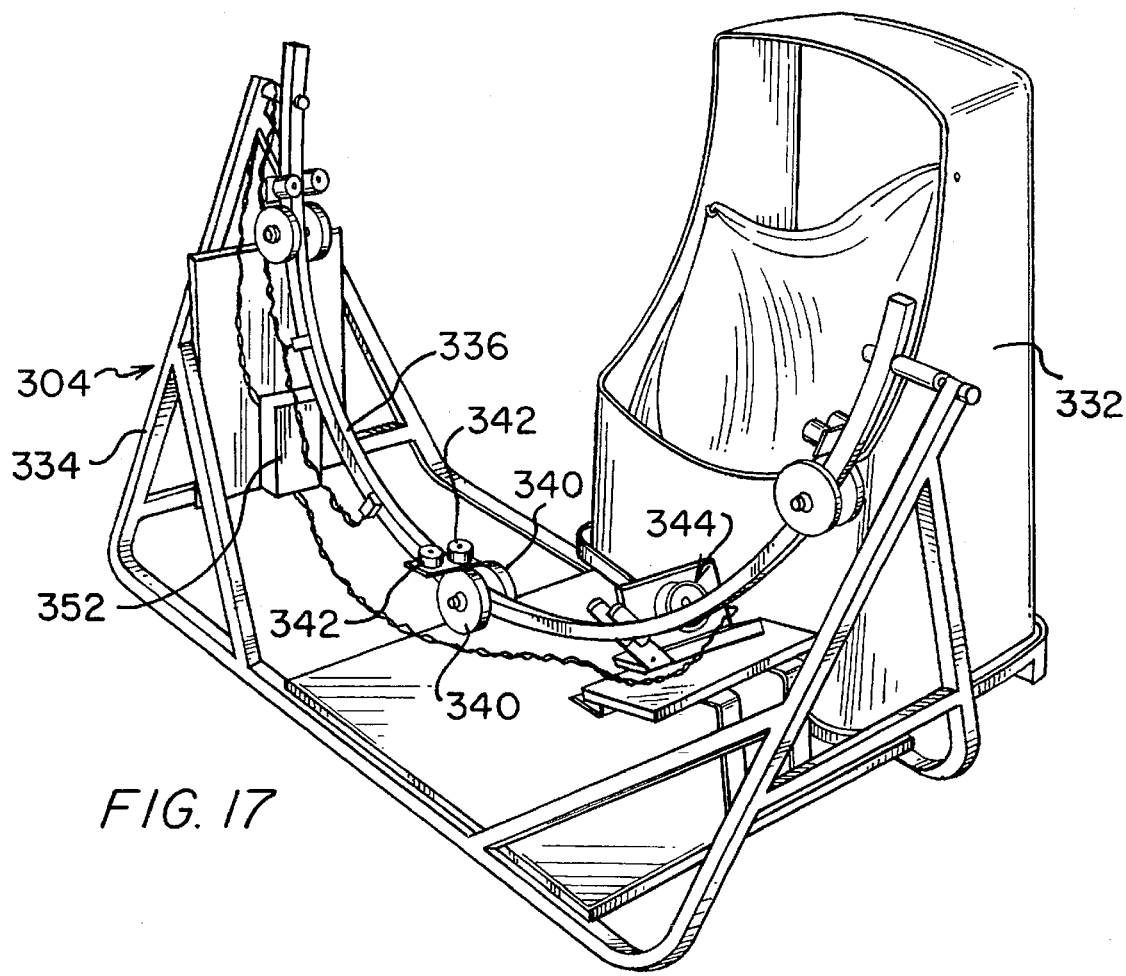
FIG. 17
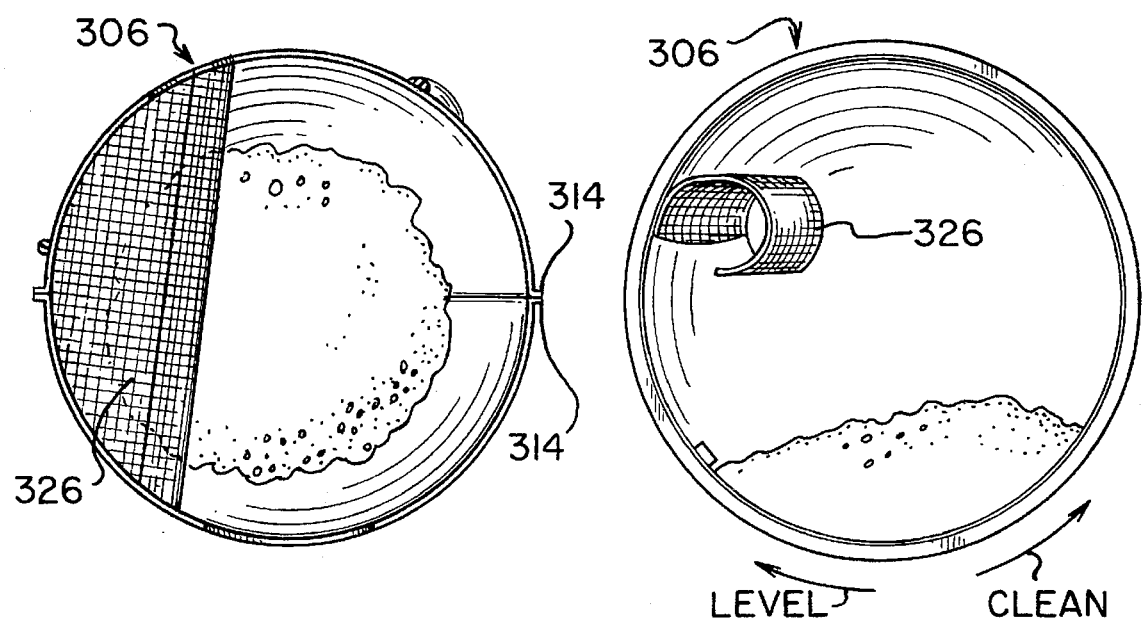
FIG. 20
FIG. 21

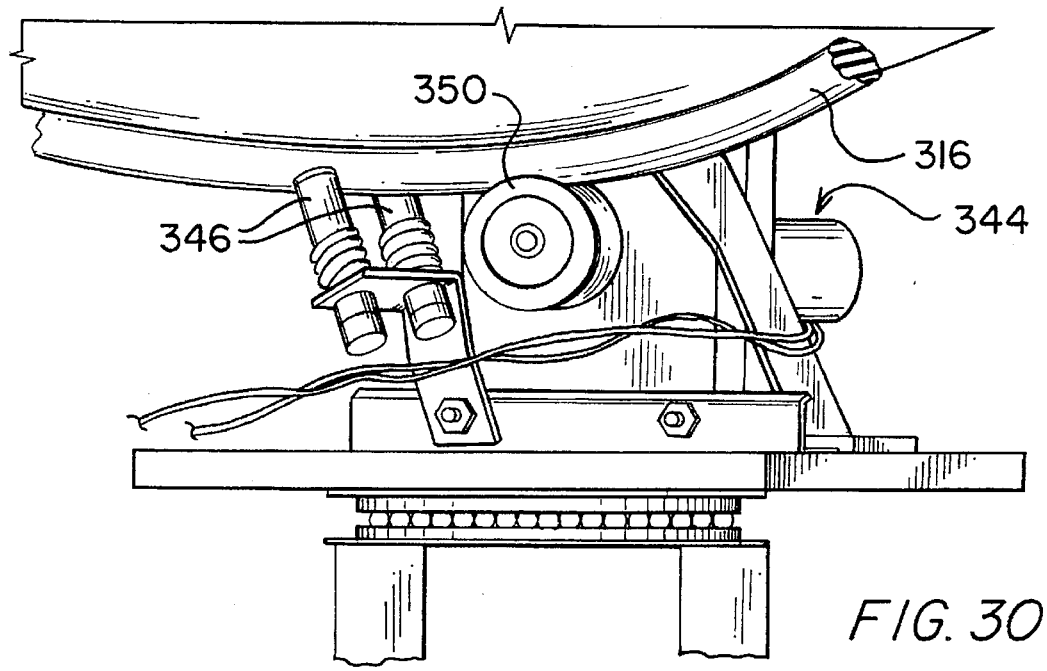
FIG. 30
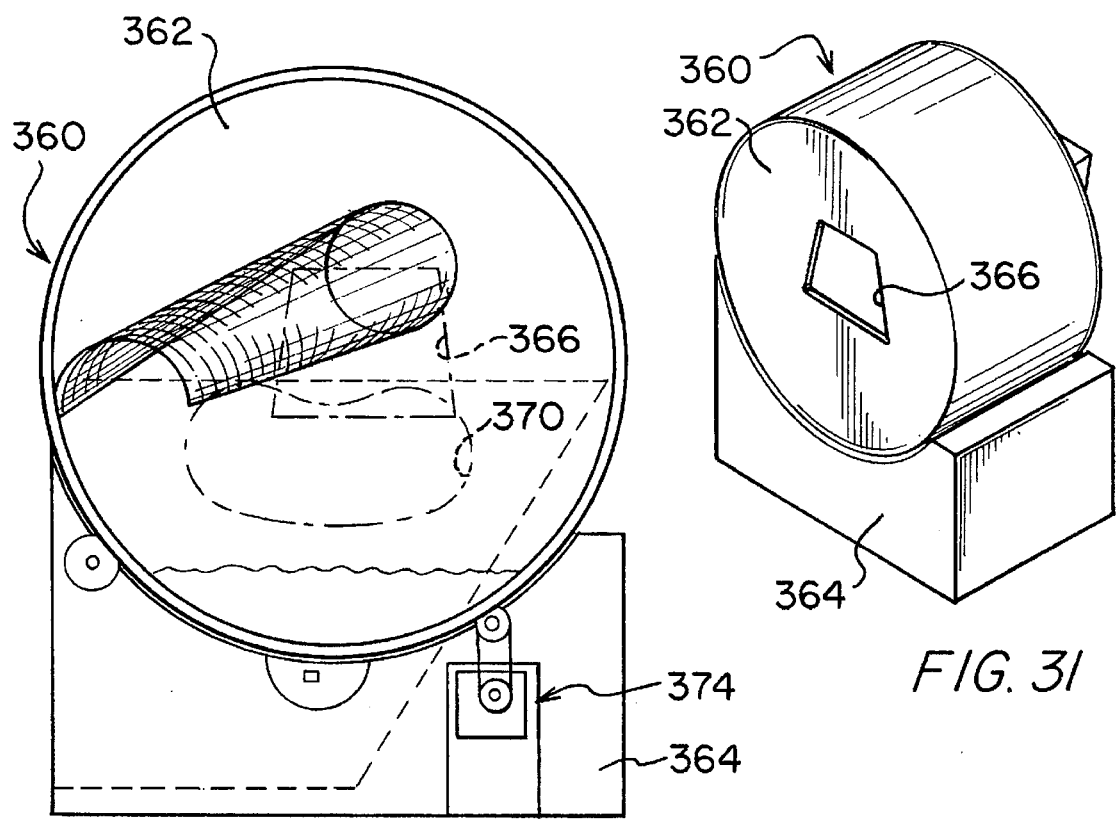
FIG. 31
FIG. 32

AUTOMATIC CAT LITTER DEVICE AND METHOD

The present invention relates to an apparatus and method for separating and removing animal waste material from litter, and in particular, to a technique including providing a cat litter box that automatically removes the cat waste material from the litter.

BACKGROUND OF THE INVENTION

Traditionally, litter boxes for cats have included a shallow box-shaped device, open at the top, which contains cat litter. A cat steps into the box and deposits waste material into the litter. These open cat litter boxes have several disadvantages. The open nature of these boxes does very little to contain or control the unpleasant odors from the animal waste material. Consequently, such boxes are typically placed at a remote location in the residence. Also, this type of cat box requires periodic efforts by the cat owner to remove the animal waste material, replace the litter on occasion, and on a less frequent basis, wash the cat litter box. In addition, due to the tendency of cats to dig, kick, and otherwise distribute the litter within the cat box, it is common for a fair amount of litter or waste to be kicked out of the shallow cat box. Depending on the habits of the individual cat, the cat sometimes "misses the litter box" and deposits the waste on the side of the device because the low sides of the device do not prevent this behavior. Further, a significant amount of litter is tracked out of the cat box on the bottom of the cat's paws. All of this results in an undesirable collection of cat litter on the ground surrounding the cat box. Some of these problems have been addressed by cat litter boxes which include higher side walls and a top and have openings at one or either end to allow the cat to enter and exit the box. Some of these boxes contain deodorizing materials in the box to help to mask the unpleasant odors from the animal waste material. These boxes address some of the problems discussed above while failing to address others. In addition, recent developments in litter technology have provided "clumpable" litter which creates a clump of litter around liquid waste material, making it easier to scoop out this material.

More of the problems have been addressed in a manual cat litter device disclosed in U.S. Pat. No. 4,120,264. This device includes a manually rotating drum resting on a support base having rollers thereon. The drum is partially enclosed on either end with an opening found in each end. A first opening allows the cat to enter and exit the drum to deposit waste material in the cat litter contained therein. A second opening on the opposite end of the drum places a waste storage bag in communication with the interior of the drum. A complex arrangement of screens are mounted within the drum to communicate with the second opening. When the cat owner desires to remove the waste material from the drum, he can rotate the drum manually relative to the support base through a single, full rotation so that the litter passes through the screens and the animal waste material is "filtered-out" and directed toward the second opening where it is expelled from the drum into the waste storage bag. While providing some improvements, this approach has several disadvantages. First of all, the device is manual, requiring operator actuation which may result in the device going through long periods without an operational cycle. Second, even in the waste storage bag, the waste material is not closed off from the surrounding environment so that unpleasant odors can still pass from the waste storage bag through the drum to the surrounding environment. Third, no measures have been taken to prevent undesired tracking of the litter out of the drum by the cat. Fourth, because of the two openings on opposite sides of the drum, both sides of the device must be accessible. The front must be accessible for the cat to enter and exit the drum and the back must be accessible for the owner to change waste storage bags.

A motorized cat litter device is disclosed in U.S. Pat. No. 4,846,104. This device includes a motor-driven rotating drum which appears to be axially mounted to a support base which includes a waste storage area for receiving the waste discharged from the rotating drum. The rotating drum includes an inner compartment defined therein and a screen associated therewith. A single opening is provided in the outer circumference of the rotating drum to allow for ingress and egress of the animal as well as expulsion of the waste material from the drum. The drum is rotated through a full rotation so that the clean litter passes through the screen while the waste material is filtered-out by the screen and directed out of the single opening into the waste storage area in the support base. This device solves some of the problems described above while neglecting to address others. One significant disadvantage of the approach is that the clean litter is dumped a significant distance from the inner compartment to the bottom portion of the drum as shown in FIG. 5D of U.S. Pat. No. 4,846,104. This action together with the fact that the litter is forced to pass through the screen a second time causes the cat litter to be broken into smaller bits and creates a significant cloud of dust on each cycle. Portions of these dust clouds exit the rotating drum and fall out as dust on the ground in the vicinity of the cat litter device. Also, the device apparently must be accessible on opposite sides for use and for cleaning, which is inconvenient and limits the locations for convenient placement of the device in the residence. In addition, there are sanitation concerns arising from the use of the waste outlet as the animal entrance/exit.

It is against this background and the desire to solve the problems of the prior art that the present invention has been developed.

SUMMARY OF THE INVENTION

Accordingly, it is an object of the present invention to provide an automatic cat litter box which significantly limits any unpleasant odors emanating therefrom.

It is also an object of the present invention to provide an automatic cat litter box which is convenient to use for both the cat and the cat owner.

It is further an object of the present invention to provide an automatic cat litter box which significantly reduces the amount of cat litter and dust therefrom deposited outside of the device.

It is still further an object of the present invention to provide an automatic cat litter box which need only be accessed from one side for use, operation, cleaning, and removal of the bag containing the waste.

It is still further an object of the present invention to provide an automatic cat litter box which automatically operates as necessary to limit unpleasant odors emanating from the device.

Additional objects, advantages and novel features of this invention shall be set forth in part in the description that follows, and in part will become apparent to those skilled in the art upon examination of the following specification or may be learned by the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described therein, the present invention is directed to an apparatus for receiving and disposing of waste material from an animal. The apparatus includes a rotatable chamber having a first opening defined in an exterior wall thereof, with the opening being suitable for ingress and egress of the animal. The chamber is adaptable to receive and substantially retain litter and has a second opening defined in the exterior surface for selective disposal of the waste material therethrough. The chamber also includes a septum in the interior of the chamber. The septum is attached to the chamber to form an inner compartment within the chamber. The inner compartment has a port to place the inner compartment in fluid communication with the chamber. The second opening is defined in the exterior surface of the chamber at a position adjacent the attachment of the septum to the chamber. The chamber also includes a screen operatively associated with the port to screen out objects, including waste material, which are greater than a predetermined size from entering the inner compartment. The apparatus also includes a support base for supporting the rotatable chamber and a means associated with the rotatable chamber and the support base for automatically rotating the chamber relative to the support base. The rotation means rotates the chamber in a first direction by an amount less than a full rotation to cause the litter to pass through the screen and into the inner compartment and cause the waste material to be caught by the screen and to be expelled downward through the second opening out of the rotatable chamber.

The screen of the apparatus may be pivotally attached at one side and the rotating means may be further operative to rotate the chamber in an opposite second direction subsequent to the rotation in the first direction which causes the litter to be placed in the inner compartment. This subsequent opposite rotation causes the litter to slide out of the inner compartment and the pivotal nature of the screen allows the screen to ride on top of the litter so the litter slides out of the inner compartment with a substantial majority of the litter not passing through the screen. The rotatable chamber may be in a first position relative to the support base prior to rotation and the chamber may be rotated to a second position to expel the waste material and the subsequent opposite rotation may carry the chamber through the first position to a third position for leveling the litter in the chamber prior to again rotating the chamber in the first direction to return the chamber back to the first position. The rotatable chamber may rotate about a rotational axis wherein the first opening is defined in the chamber so that the rotational axis passes therethrough. The support base may have an opening defined therein to receive waste material expelled from the rotatable chamber. The support base may be adapted to receive a storage bag and hold the bag in an open position to receive the expelled waste material therein. The support base may include a sliding drawer slidably mounted to the support base, with the drawer receiving the storage bag. The support base may further include a means for closing the bag as the drawer is opened and opening the bag as the drawer is closed.

The rotatable chamber may further include a step attached to the exterior surface thereof adjacent the first opening therein and where the step may be sloped to cause any litter tracked out of the chamber onto the step to move toward the chamber. The support base may include a step formed thereon, with the step being sloped to cause any litter tracked out of the chamber onto the step to move toward the chamber, and a return port may be defined in the exterior surface of the support base adjacent the step to allow litter to be returned to the interior of the support base. The apparatus may further include a cover flap rotatably mounted to the support base adjacent the return port to selectively cover the port.

The rotatable chamber may be received on top of the support base, the support base generally having the shape of an upright cylinder and the chamber generally having the shape of a spheroid, with the spheroid being generally spherical with two flattened sides through which the axis of rotation passes so that the spheroid rests in the opening inherently defined in the top of the upright cylinder. The apparatus may further include slidable surfaces having a relatively low coefficient of friction, which are located along the top of the upright cylinder for the rotatable chamber to slide thereon while rotating. The rotating means may include a motor mounted inside the support base and a drive track mounted on the exterior surface of the rotatable chamber, wherein the motor operatively interacts with the drive track to rotate the chamber. The drive track may extend along only a portion of the entire circumference of the spherical portion of the chamber, so that the motor can only rotate the chamber around a fraction of a complete rotation.

The rotating means may include a motor operatively associated with the chamber and the support base to cause the chamber to rotate relative to the support base and a controller in communication with the motor to provide control signals to the motor. The controller may automatically control the motor to rotate the chamber on a periodic basis, the length of the period being selectable by an operator. The periods may be programmable by selecting the times of day when the controller will rotate the chamber, with the times of day being applicable each succeeding day until the selections are changed. The rotating means may further include a sensor for sensing the relative position of the chamber to the support base and for supplying a position signal to the controller. The controller may provide an alarm indication if the controller detects an abnormality in the rotation of the chamber relative to the support base. The rotating means may further include a sensor for sensing the presence of an animal in the chamber and for supplying a presence signal to the controller, and the controller may automatically control the motor to rotate the chamber after a predetermined time period following the occurrence of the present signal. The sensor may be a motion sensor.

The present invention is also directed to a method for removing animal waste from litter in a rotatable chamber having an inner compartment with a screen attached thereto, a first opening defined therein for ingress and egress of an animal, and a second opening defined therein for expelling the removed waste from the rotatable chamber. The method includes the steps of rotating the chamber in a first direction a sufficient amount to allow the litter to pass through the screen into the inner compartment and allow the waste material to be expelled from the rotatable chamber through the second opening. The method also includes the step of rotating the chamber in a second and opposite direction a sufficient amount to allow the litter to slide out of the inner compartment.

The present invention is also directed to an apparatus for receiving and disposing of waste material from an animal. The apparatus includes a rotatable chamber having a first opening defined in an exterior wall thereof for ingress and egress of the animal. The chamber is adaptable to receive and substantially retain litter therein. The chamber has a second opening defined in the exterior wall thereof for selective disposal of the waste material therethrough. The chamber includes a screen disposed within the chamber and positioned across a portion of the chamber and communicating with the second opening so that waste material caught by the screen can be urged toward the second opening by the force of gravity when the screen is tilted. The apparatus also includes a support base for supporting the rotatable chamber and a means associated with the rotatable chamber and the support base for rotating the chamber relative to the support base. The rotation occurs about a plurality of axes wherein the initial rotation of the chamber is substantially about a first axis and brings the screen into contact with the litter and waste material. Subsequent rotation of the chamber is about at least one other axis not parallel with the first axis, with the subsequent rotation tilting the screen sufficiently to allow the force of gravity to urge the waste material through the second opening.

The present invention is also directed to a method for receiving and disposing of waste material from an animal. The method includes the step of receiving the waste material within a chamber including an opening defined in the surface of the chamber and a screen disposed within the chamber. The method also includes the step of rotating the chamber about a plurality of axes to catch the waste material with the screen and to direct the waste material toward and out of the opening.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention. In the Drawings:

FIG. 16 is an isometric view of a second embodiment of an automatic cat litter device according to the present invention;

FIG. 17 is an isometric view of a support base and attached waste receptacle of the device shown in FIG. 16;

FIG. 18 is an isometric view of a waste receptacle shown in FIG. 17, showing the attachment of a waste storage bag therein;

FIG. 19 is a close-up isometric view of a pair of guide fingers and rollers of a cradle included in the support base shown in FIG. 17;

FIG. 20 is a sectional view of the rotatable chamber of the device shown in FIG. 16, taken along line 20—20 of FIG. 22, showing a screen within the rotatable chamber and a pile of litter in the bottom thereof;

FIG. 21 is a sectional view of the rotatable chamber of the device shown in FIG. 16, taken along line 21—21 of FIG. 24, showing the screen and the pile of litter within the rotatable chamber;

FIG. 30 is a close-up view of the motor and rotatable chamber of FIG. 29, showing the pivotally-mounted motor after it is pivoted to a different orientation due to the irregular positioning of the drive track;

FIG. 31 is an isometric view of a third embodiment of an automatic cat litter device according to the present invention;

FIG. 32 is a rear view of the device shown in FIG. 31; and

DETAILED DESCRIPTION OF THE PREFERRED EMBODIMENTS

Figure 1:
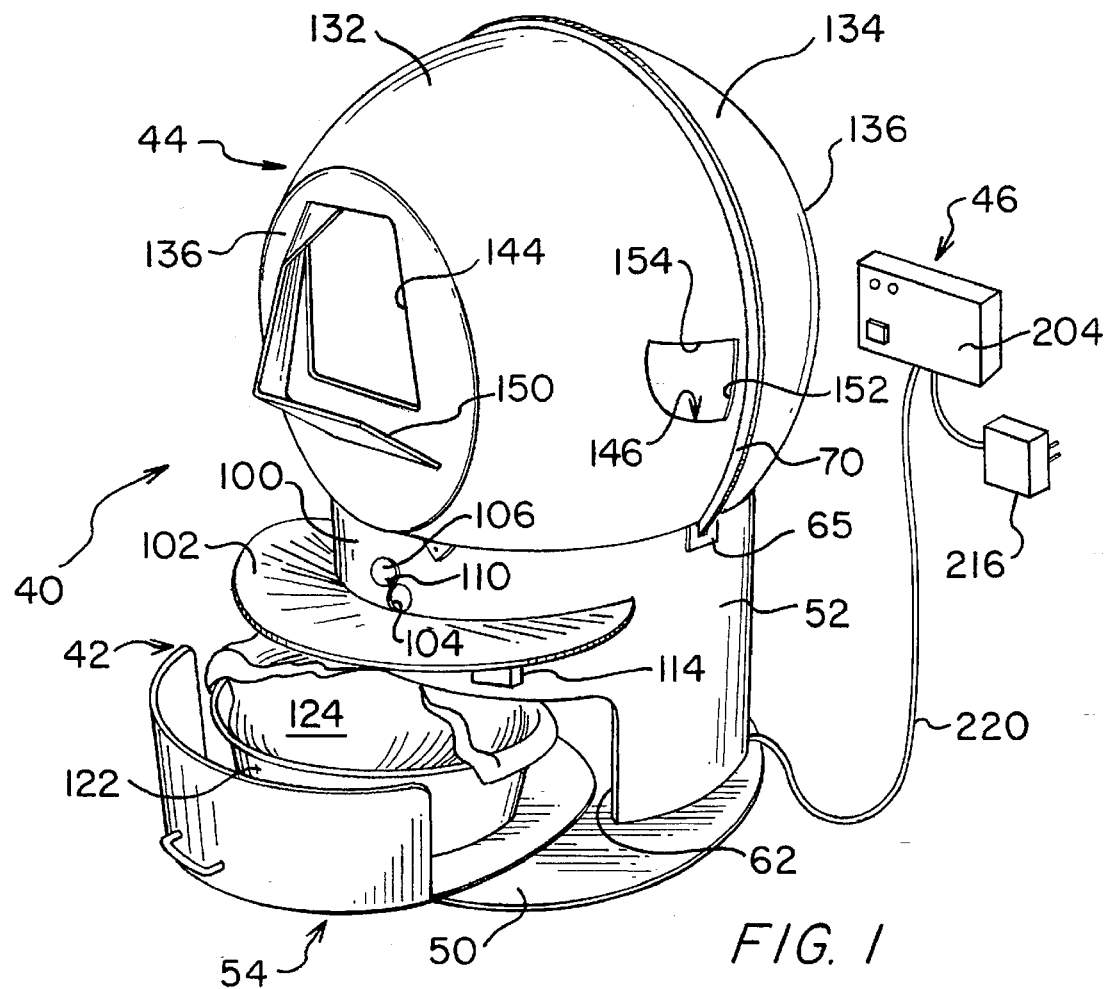
FIG. 1 is an isometric view of an automatic cat litter device according to the present invention, showing a drawer in an open position.
Figure 9:
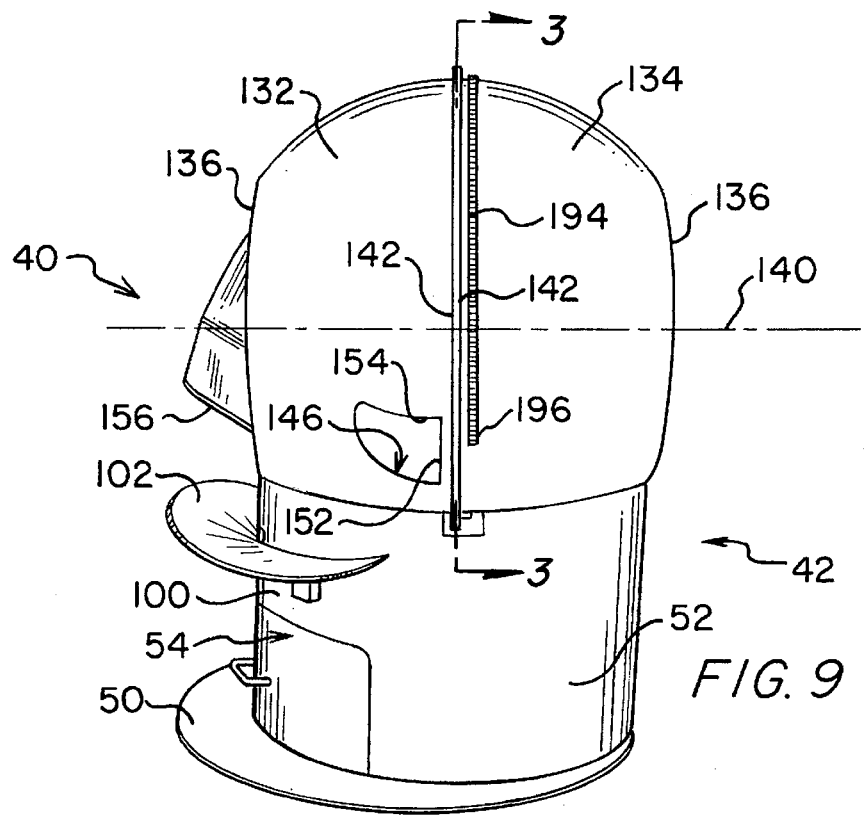
FIG. 9 is a side view of the device of FIG. 1.
Figure 10:
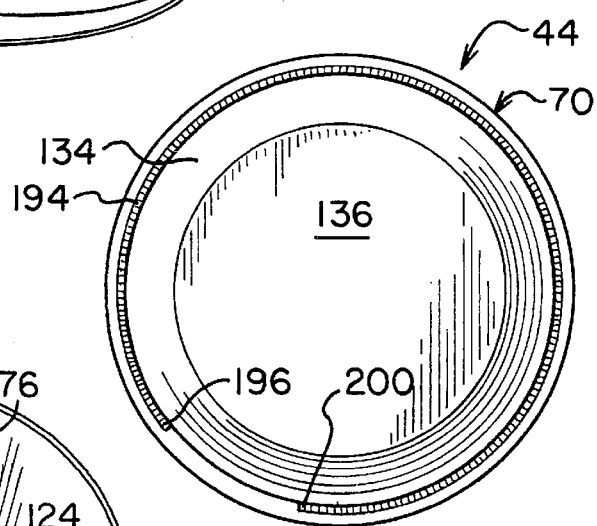
FIG. 10 is a rear view of the rotatable chamber of FIG. 1.

The automatic cat litter device has been developed in several different embodiments. The structure and operation of each of these embodiments will be discussed. A first embodiment of an automatic cat litter device 40 is shown in FIG. 1. Generally, the device 40 includes a support base 42, a rotatable chamber 44 containing litter 45, and a controller 46. The support base 42, also shown in FIGS. 1, 9, and 11, generally includes a base pad 50, a cylindrical body 52, and a drawer 54.

The base pad 50 may be composed of any suitable plastic, wood, or other relatively-stiff material. When viewed from above the device 40, the base pad 50 is circular in shape and of greater diameter than the cylindrical body 52 which is attached thereto. The center of the circular base pad 50 is offset from the center of the cylindrical body 52 so that as viewed from the rear the outer edge of the base pad 50 and the cylindrical body 52 are flush with each other. This feature allows the device 40 to be stored as close as possible to a wall (not shown) behind the device 40, such as in a closet. The height of the base pad 50 must be sufficient to allow the drawer 54 to operate even when the device 40 is sitting on a soft carpet. Preferably, this height may be five-eighths of an inch. It is important that the base pad 50 have sufficient stiffness to reduce distortions due to forces which may occur during operation of the device 40, especially at times when a significant portion of the weight of the rotatable chamber 44 is not located above a drive motor 56 as will be discussed in further detail below.

Figure 2:
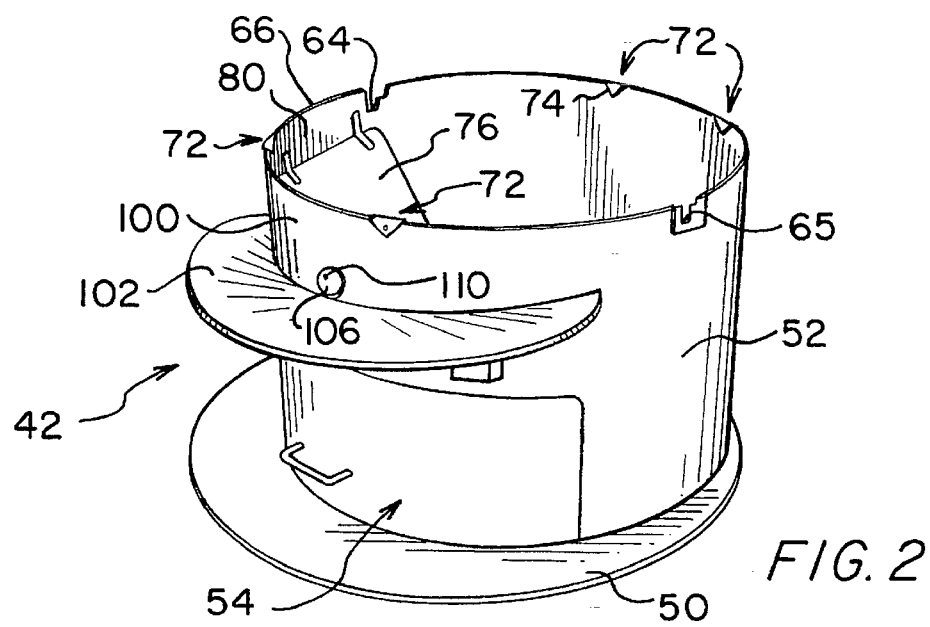
FIG. 2 is an isometric view of a support base of the device shown in FIG. 1, showing the drawer in a closed position.
Figure 11:
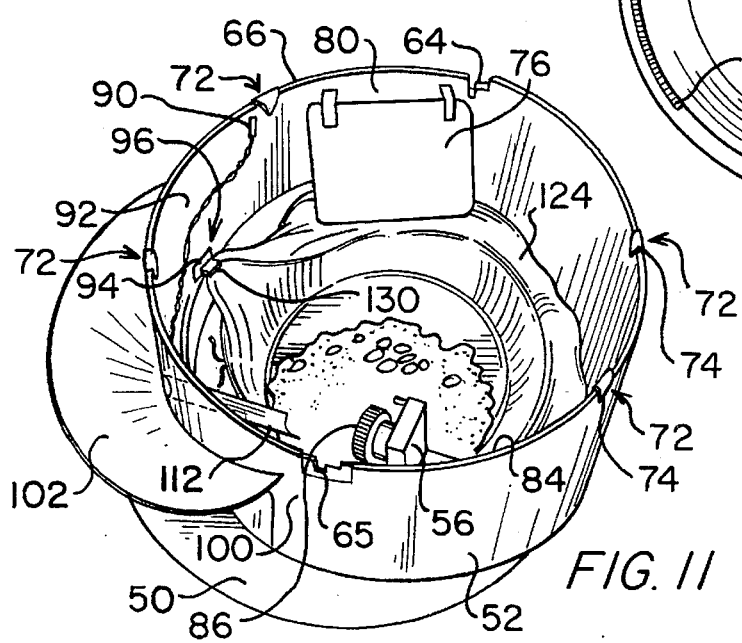
FIG. 11 is an isometric view of the support base shown in FIG. 2, taken from a greater relative height to view the interior of the support base.

The cylindrical body 52 is mounted to the base pad 50 with a plurality of angle brackets 60 and is preferably rigid enough to minimize the above-mentioned distortions during operation of the device 40. The cylindrical body 52 may be composed of ABS plastic. Alternatively, it may be desirable to form the body in a frusto-conical section, for additional strength and stiffness characteristics. As seen in FIG. 1, the cylindrical body 52 has a large opening 62 defined on the front side thereof to slidably receive the drawer 54. As seen in FIG. 2, the cylindrical body 52 also includes a pair of notches 64 and 65 on a top edge 66 thereof to receive a locating flange 70 defined on the rotatable chamber 44. Also located at spaced intervals on the top edge 66 of the cylindrical body 52 are a plurality of patches 72 having slidable surfaces 74 thereon. These surfaces 74 preferably are composed of a non-stick material having a very low coefficient of friction, such as Teflon™. Accordingly, the rotatable chamber 44 can be easily rotated while resting on the cylindrical body 52 and with a relatively lesser force required to rotate the chamber 44 than if the slidable surfaces 74 were not present. As seen in FIGS. 2 and 11, a deflector 76 is attached to an inner side surface 80 of the cylindrical body 52 to deflect waste material 82 expelled from the rotatable chamber 44. Alternatively, or in addition to the patches 72 with slidable surfaces 74, the cylindrical body 52 could be provided with a plurality of spherical ball bearing casters to support the rotatable chamber so as to reduce the rotational resistance due to friction.

Figure 7:
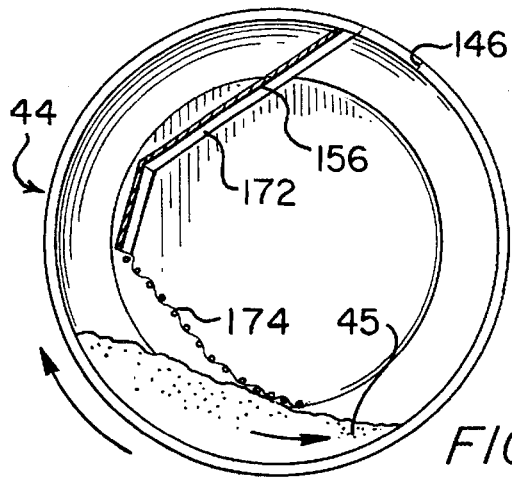
FIG. 7 is a sectional view as in FIG. 3, showing the chamber in an intermediate position during rotation in a clockwise direction where the litter is sliding out of the inner compartment and the screen has pivoted to ride on top of the litter.
Figure 8:
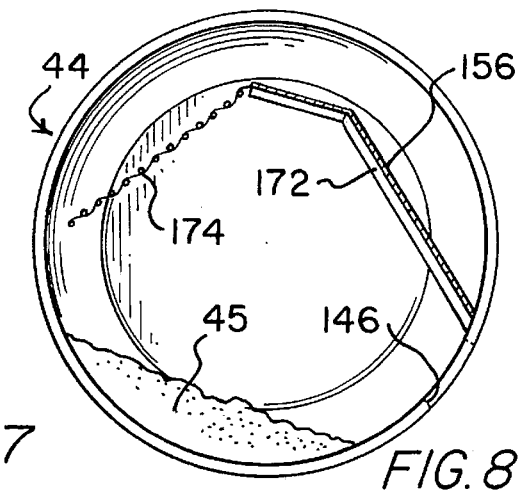
FIG. 8 is a sectional view as in FIG. 3, showing the chamber in a litter-leveling position which is past the home position.

Mounted on the opposite inner side surface 84 of the cylindrical body 52 from the deflector 76 is the electrical drive motor 56 having a drive shaft with a cogged drive wheel 86 attached thereto. The motor 56 is mounted with a bracket in a conventional manner to the side surface 84. In order to provide sufficient torque to drive the rotatable chamber 44 and in order to rotate the chamber 44 at the desired relatively-slow rate, a four and one-half rpm shaft speed electrical motor is provided such as Model No. 2L006 available through Dayton Permanent Magnet of Dayton, Ohio. As viewed from the front of the device 40, the motor and drive wheel are located below and slightly to the right of the center of the rotatable chamber 44. This position is designed to correspond with the center of the mass of litter 45 so that the center of gravity of the load to be driven by the motor 56 is as close to being directly above the drive wheel 86 as practical. When the center of the litter 45 is horizontally offset from the drive wheel 86 as in the positions shown in FIGS. 7 and 8, there is a force couple that tends to move the chamber 44 away from and off the drive wheel 86 if the cylindrical body 52 and/or base pad 50 will distort to allow the chamber 44 to move laterally away from the drive wheel 86. For this reason, it is important that the cylindrical body 52 and base pad 50 be able to resist such distortion.

In order to sense magnets in the nearby vicinity for accurate control of the motor 56, a Hall effect sensor 90 is also provided on the inner front surface 92 of the cylindrical body 52, preferably at a point between the two notches 64 and 65 on the top edge 66 corresponding to approximately sixty degrees of rotational travel from the left locating notch 64 toward the right locating notch 65. An exemplary Hall effect sensor is available as Model No. IC DN6852 from Panasonic. Also located on the inner front surface 92 of the cylindrical body 52 is a patch of one portion 94 of a conventional, releasable hook and loop fastener 96.

On the outer front surface 100 of the cylindrical body 52, a step 102 is provided above and centered slightly to the right of the center of the opening 62 for receiving the drawer 54. So as to reduce the amount of litter 45 tracked away from the device 40, the step 102 is sloped to cause litter 45 to roll, slide, or otherwise move toward the cylindrical body 52. For the purpose of returning the litter 45 on the step 102 back to the interior of the device 40, a port 104 is defined through the cylindrical body 52 at a central point just above the attachment point of the step 102 to the cylindrical body 52. A cover flap 106 with a rotation-pin hinge 110 is employed so that odors from the interior of the cylindrical body 52 cannot emanate through the port 104. The flap 106 can be rotated to expose the port 104 and allow litter 45 to be brushed from the step 102 into the port 104. Communicating with the port 104 on the inner front surface 92 of the cylindrical body 52 is a return chute 112 which is angled downward to allow the litter 45 to slide therealong. In order to sense the presence of a cat while visiting the device 40, a motion sensor 114 such as Radio Shack Motion Sensor 49-630A, can be mounted to the bottom side of the step 102 in a conventional manner.

Figure 12:
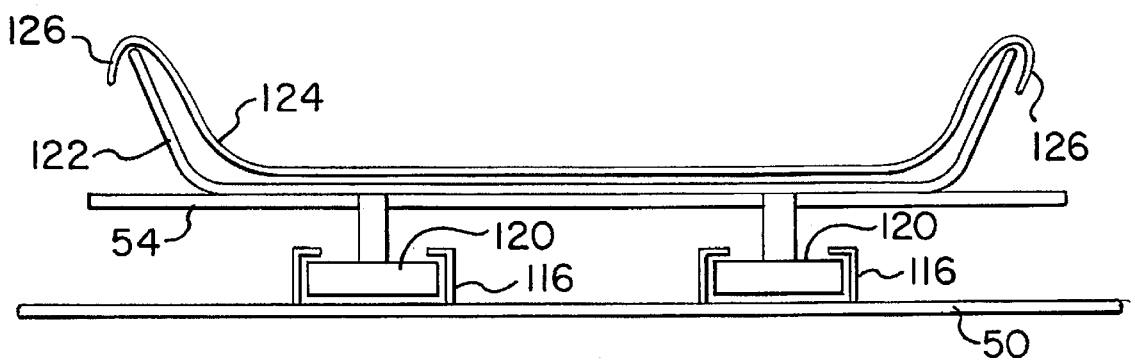
FIG. 12 is an enlarged sectional view of the attachment of the drawer to a base pad of the support base shown in FIG. 2.

The drawer 54 is slidably mounted to the top surface of the base pad 50 in a conventional manner. As seen in FIGS. 1 and 12, this mounting includes a pair of fixed slide rails 116 mounted to the base pad 50 and a corresponding pair of slide rails 120 attached to the bottom surface of the drawer 54. A basin 122 is provided in and attached to the drawer 54 by a plurality of releasable pile and loop fasteners (not shown). A waste storage bag 124 is placed in the basin 122 in an open position with the top edge 126 of the storage bag 124 folded over the top edge of the basin 122. Preferably, a patch containing a mating portion 130 of the releasable hook and loop fastener 96 is provided along the top edge 126 of the storage bag 124 for releasable engagement with the aforementioned portion 94 affixed to the inner front surface 92 of the cylindrical body 52.

The operation of the drawer 54 can be seen in FIGS. 1 and 11. In FIG. 11, due to the engagement of the releasable hook and loop fastener 96 on the waste storage bag 124 and the cylindrical body 52, the waste storage bag 124 is in an open position within the basin 122. It can be appreciated in FIG. 11 that the deflector 76 is positioned so that waste material 82 striking the deflector 76 will be directed toward the center of the device 40 so as to fall into the open waste storage bag 124 in the basin 122. In addition, it can also be seen in FIG. 11 that the return chute 112 is positioned so that litter 45 which is returned from the step 102 to the port 104 and down the return chute 112 will be directed toward the center of the device 40 to fall into the open waste storage bag 124. As the drawer 54 is opened toward the position shown in FIG. 1, the waste storage bag 124 will begin to close by folding over itself due to the engagement of the releasable hook and loop fastener 96. When the drawer 54 is fully opened, the bag 124 is folded over itself and the operator can reach into the drawer 54 to disengage the releasable hook and loop fastener 96 and tie the bag 124 closed with a tie wrap which may also be provided along the top edge 126 of the waste storage bag 124. A new waste storage bag 124 can be placed in the basin 122 and the releasable hook and loop fastener 96 can be engaged to operate as described above. The size of the basin 122 and the waste storage bag 124 are estimated to have sufficient capacity to contain at least two weeks of animal waste material 82 from a single cat.

The rotatable chamber 44 is formed from two modified hemispherical members 132 and 134 which may be composed of similar material to the cylindrical body 52. Both the front hemispherical member 132 and the rear hemispherical member 134 have a flattened side 136 thereon. The flattened side 136 is located on each hemisphere 132 and 134 at a location perpendicular to an axis of symmetry 140 passing through each hemisphere, which is substantially coaxial with an axis of rotation for the chamber 44. Each hemisphere 132 and 134 is formed with a flange 142 protruding outward therefrom. When the two hemispheres 132 and 134 are joined to form a modified sphere, or spheroid, a plurality of screws are used to attach the flanges 142 of each hemisphere 132 and 134 to each other. The joining together of these two flanges 142 produces a protruding or locating flange 70 on the spheroid. The front hemisphere 132 is provided with two openings defined therein, a front opening 144 on the flattened side 136 thereof for ingress and egress of the cat, and a side opening 146 on the side thereof for expulsion of waste material 82 from the rotatable chamber 44. The front opening 144 is shaped as a quadrangle having two side legs of approximately equal length, and a bottom leg that is longer than a top leg.

The inner surface of the rotatable chamber 44 is adapted to allow the litter to slide easily therealong. In addition, it is preferable to provide a coating on the inner surface which resists the sticking of wetted litter to the inner surface. This coating may be achieved by rubbing a paraffin-based candle wax on the inner surface of the rotatable chamber 44, particularly in the region where the litter 45 resides when the rotatable chamber 44 is in the home position shown in FIG. 3.

A step 150 is provided adjacent the front opening 144. The step 150 surrounds portions of three of the legs of the quadrangle. The broadest portion of the step 150 is adjacent and offset below the bottom leg of the quadrangle. It is sloped so as to cause litter 45 on the step 150 to move back against the flattened side 136 of the front hemisphere 132. The second broadest portion of the step 150 is adjacent the left side leg of the quadrangle and is also sloped to cause litter 45 to roll toward the interior of the front hemisphere 132. The third portion of the step 150 corresponds to and follows a portion of the top leg of the quadrangle. It can be appreciated that as the spheroid is rotated, the litter 45 is increasingly urged toward the front opening 144 to return to the interior of the spheroid.

Figure 6:
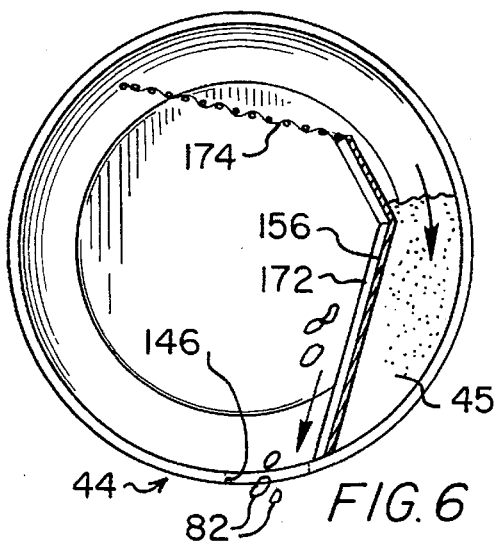
FIG. 6 is a sectional view as in FIG. 3, showing the chamber in a dump position where the waste material is expelled out of an opening in the chamber.
Figure 13:
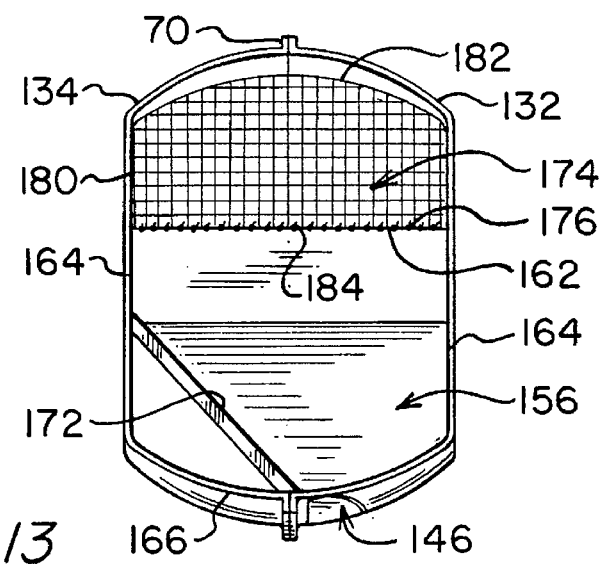
FIG. 13 is a sectional view of the rotatable chamber shown in FIG. 1, taken along line 13—13 of FIG. 5, showing the screen, the septum, and a guide rail defined thereon.

The side opening 146 is irregularly shaped and preferably has a flat leg 152 as close as is practical to the flange 142 of the front hemisphere 132, and a second flat leg 154 on one side thereof. In the interior of the spheroid and adjacent the side opening 146, there is an inner wall or septum 156 which defines an inner compartment 160 within the spheroid. The septum 156 may be formed of sheet metal or any other suitable material. As can be seen in FIG. 13, the septum 156 is irregularly shaped including a flat bottom edge 162, a pair of flat side edges 164, and a curved top edge 166. The septum 156 is folded along a line connecting the two side edges 164. The septum 156 is glued or otherwise attached to the inner surface of the spheroid along the septum's side edges 164 and curved top edge 166. As can be seen, the bottom edge 162 of the septum 156 is spaced away from the surface of the spheroid, defining a port or opening 170 into the inner compartment 160. A guide rail 172 is provided from a location where the right side edge 164 joins the curved top edge 166 to a location at the mid-point on the curved top edge 166. This guide rail 172 may preferably be approximately one inch tall. As can be appreciated in FIGS. 6 and 13, the guide rail 172 serves to direct the waste material 82 toward the side opening 146 for expulsion from the rotatable chamber 44.

A screen 174 is pivotally mounted to the bottom edge 162 of the septum 156. The screen 174 preferably is provided with a multitude of square openings defined therein having dimensions for each opening of approximately six by six millimeters. Cat litter 45 is known to primarily include particles which are between one and two millimeters in diameter. In a similar fashion as the septum 156, the screen 174 includes a flat bottom edge 176, a pair of flat side edges 180, and a curved top edge 182. The screen 174 is pivotally connected along its bottom edge 176 to the bottom edge 162 of the septum 156 by some suitable means. This means may include providing a plurality of holes 184 defined along the bottom edge 162 of the septum 156 and hooking portions of the screen 174 through those corresponding holes 184. The curved top edge 182 of the screen 174 may preferably be covered with tape or a rubber or plastic surface. In certain orientations of the rotatable chamber 44, the curved top edge 182 rests against the inner surface of the spheroid, while in other orientations the curved top edge 182 is spaced apart from the inner surface of the spheroid due to the pivotal nature of the connection of the screen 174 to the septum 156. The screen 174 is resiliently flexible so that when the curved top edge 182 is forced further away from the inner surface of the spheroid, the screen 174 can curve after the screen has pivoted as far as its pivotal connection will allow.

Figure 14:
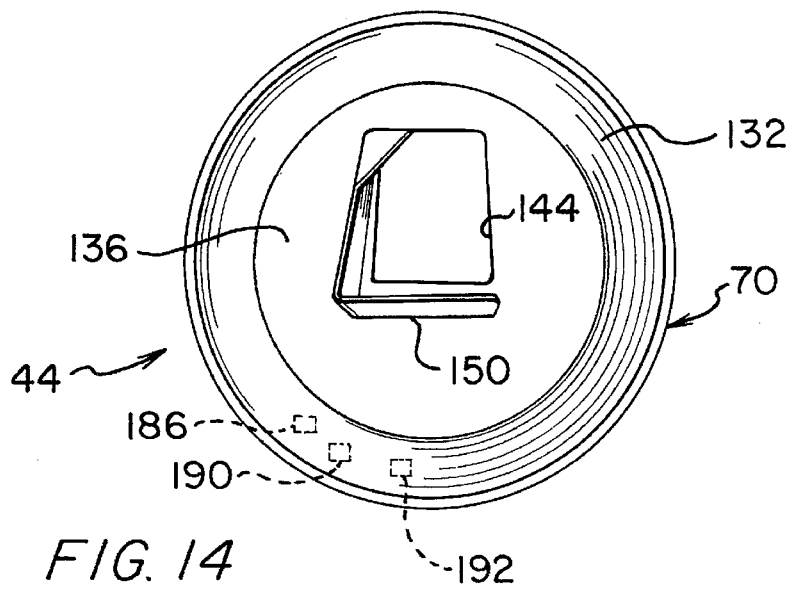
FIG. 14 is a front view of the rotatable chamber shown in FIG. 1, showing three magnets in phantom which are mounted on the interior of the chamber.

Three permanent magnets 186, 190, and 192 are mounted to the inner surface of the front hemisphere 132 in the positions shown in FIG. 14, by some suitable means such as tape, glue, or other. The positions for the three magnets 186, 190, 192 define operational positions in the rotational sequence of the rotatable chamber 44 as will be discussed in further detail below.

For engagement of the rotatable chamber 44 by the drive wheel 86 associated with the motor 56, a keyed drive belt or track 194 is attached to the rotatable chamber 44 on the rear hemisphere 134 adjacent the flange 142. The keys or notches in the drive belt 194 are spaced to correspond to the cogs in the drive wheel 86 and are spaced apart on approximately 5 millimeter centers. The drive belt 194 does not extend completely around the rotatable chamber 44 but instead only extends around approximately 330° of the rotatable chamber 44. In other words, there is a gap between the first and second ends 196 and 200 of the drive belt 194. This gap provides a practical limit to the amount of rotation that the chamber 44 can be rotated through in either direction. The first end 96 of the drive belt 194 is adjacent and roughly corresponds with the side opening 146 in the rotatable chamber 44. Alternatively, the drive track 194 could be embodied in any plural number of drive tracks.

The controller 46 includes a control box housing 204, an operate switch 206, a pair of LEDs 210 and 212, and a microcontroller 214 (Microchip, Inc. PIC16C84) and associated circuit. The microcontroller 214 is powered via an AC-to-DC power supply 216 for converting AC power from a wall outlet to 12-volt DC power. The power supply 216 (exemplified by The AT&T Component Telephone Power Supply, Class Two, Model No. 5600T, which supplies 800 milliamps at 12-volts DC) plugs into a wall outlet and includes a cable for connection to the control box housing 204. Connection of the circuit to the Hall effect sensor 90, to the electric motor 56, and to the motion sensor 114, is made via a control cable 220.

Figure 15:
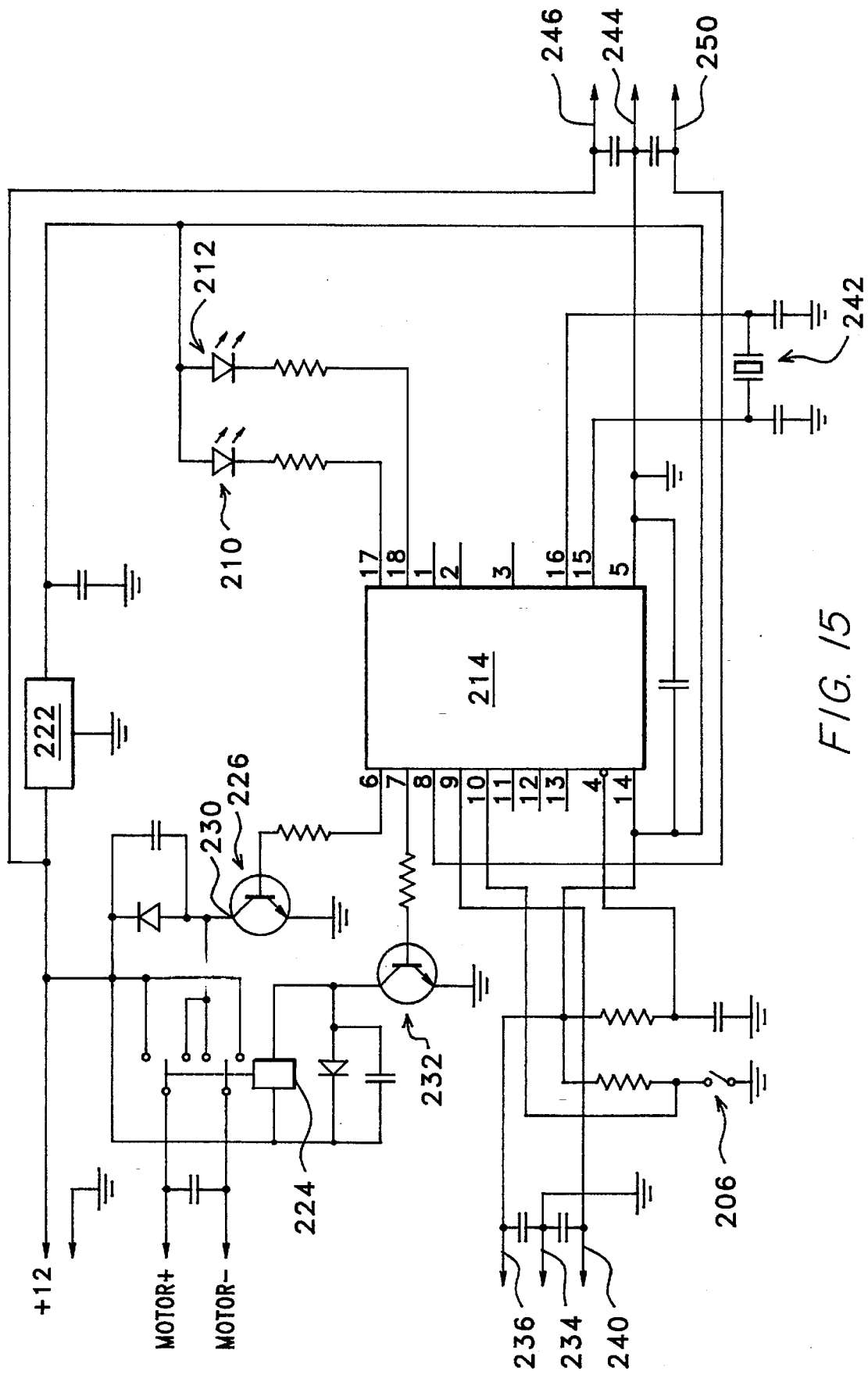
FIG. 15 is a schematic diagram of the electronic components and interconnections in the device of FIG. 1.
Figure 22:
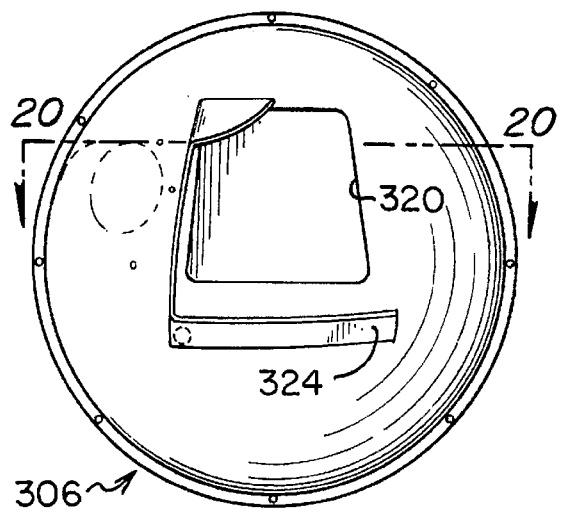
FIG. 22 is a front view of the rotatable chamber shown in FIG. 16.

The circuit associated with the microcontroller 214 is illustrated in schematic form in FIG. 15. A 5-volt DC regulator 222 receives the 12-volt DC signal from the power supply 216 and supplies a 5-volt DC signal which is provided to the microcontroller 214, the LEDs 210 and 212, the operate switch 206, and the Hall effect sensor 90. The 12-volt DC signal from the power supply 216 is also provided to the motion sensor 114 and to selected input contacts of a relay 224 (which acts as a double-pole, double-throw switch) having two pairs of input contacts and one pair of output contacts for selective application of the 12-volt DC signal to the electric motor 56.

The operate switch 206 is a normally-open push-button switch which connects pin 10 of the microcontroller 214 to circuit ground when actuated. By grounding pin 10, the microcontroller is caused to begin an operational cycle which includes bringing pin 6 of the microcontroller 214 to a high state to activate Darlington transistor 226 so that its collector terminal 230 is brought to a low state which in turn brings two of the input contacts of the relay 224 to a low state. The other two input contacts of the relay 224 are permanently connected to the 12-volts DC. At selected points in the operational cycle, pin 7 of the microcontroller 214 is brought high or low to turn a transistor 232 on or off, respectively. As the transistor 232 is turned on or off, the relay 224 is actuated to place the pair of output contacts of the relay in contact with one or the other of the pairs of input contacts of the relay 224. The output contacts of the relay are connected to the electric motor 56 through the control cable 220. With the relay 224 in one of the selected positions, the motor 56 is polarized to rotate in a first direction, while the other of the selected positions of the relay 224 causes the motor 56 to rotate in a second, opposite direction.

The Hall effect sensor 90 is connected to the circuit through three leads, one 234 to ground, one 236 to 5-volts DC, and one 240 to pin 9 of the microcontroller 214. When any one of the magnets 186, 190, or 192 passes by the Hall effect sensor 90, a signal is provided on lead 240 which is detected through pin 9 of the microcontroller 214.

A crystal oscillator 242 (such as a 3.6864 MHz H-49 crystal) is connected to file microcontroller 214 through pins 15 and 16 to provide a reference clock for the microcontroller. This clock is used to determine fifteen minute waiting periods (as discussed below) and to determine when twenty-four hours have passed. Once the operate switch 206 has been actuated, the device will operate every twenty-four hours thereafter until the power is recycled by unplugging and plugging in the power supply.

The motion sensor 114 is connected to the circuit through three leads, one 244 to ground, one 246 to 12-volts DC, and one 250 to pin 8 of the microcontroller 214. When any motions are sensed, a signal is provided on lead 250 which is detected through pin 8 of the microcontroller 214. The microcontroller 214 waits fifteen minutes after the last motion sensed and then begins an operational cycle. When a motion has been sensed and a fifteen minute waiting period has begun, the red LED 212 is activated by bringing pin 18 of the microcontroller low to forward bias the LED 212. After power-on and after an operational cycle has ended, the green LED 210 is illuminated by bringing pin 17 of the microcontroller low to indicate a ready condition.

In addition, it would be possible to provide an LCD clock display and program the microcontroller 214 to operate the device 40 at multiple periods each day. In such case, it may also be desirable to provide a back-up battery system to retain the programmed settings if power is interrupted.

Figure 3:
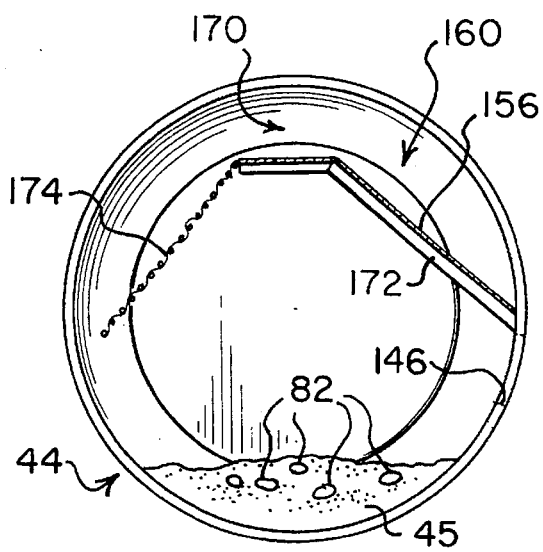
FIG. 3 is a sectional view of a rotatable chamber of the device shown in FIG. 1, taken along line 3—3 of FIG. 9, showing a home position for the chamber.
Figure 4:
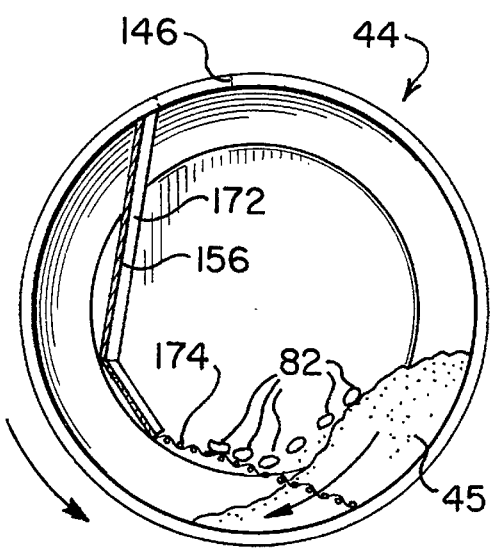
FIG. 4 is a sectional view as in FIG. 3, showing the chamber in an intermediate position during rotation in a counter-clockwise direction where a screen has pivoted to cover an opening to an inner compartment so that litter is falling through the screen into the inner compartment and clumped waste material is filtered-out by the screen.
Figure 5:
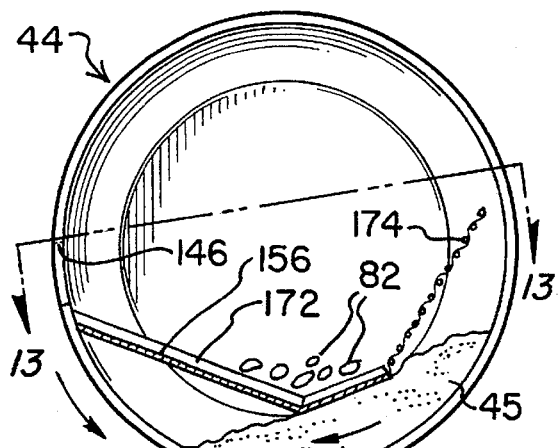
FIG. 5 is a sectional view as in FIG. 3, showing the chamber in a second intermediate position where substantially all of the litter has fallen through the screen into the inner compartment and the waste material has slid onto the center facing surface of the septum which defines the inner compartment.

The device 40 can be seen to operate as follows and as is shown in FIGS. 3-8. A desired quantity of cat litter 45 can be placed into the rotatable chamber 44. The rotatable chamber 44 is initially placed by hand onto the circular opening which is inherently defined by the top edge 66 of the open-at-the-top cylindrical body 52. The locating flange 70 of the chamber 44 rests in the two aforementioned notches 64 and 65 in the cylindrical body 52. Precise rotational placement of the rotatable chamber 44 relative to the cylindrical body 52 is not necessary as the device 40 will recognize its relative position based on the signals generated by the magnets 186, 190, and 192 and the Hall effect sensor 90. The cat enters the device 40 and deposits waste material 82 into the litter 45 as shown in FIG. 3. At a subsequent time, when the device 40 begins an operational cycle, the rotatable chamber 44 leaves the home position shown in FIG. 3 and is rotated in a counter-clockwise direction (as viewed in FIG. 4) to and through the intermediate position shown in FIG. 4. In FIG. 4, the litter 45 can be seen to pass through the screen 174 and move toward the inner compartment 160. The waste material 82 is filtered out by the screen 174. The rotatable chamber 44 is rotated further to and through the second intermediate position shown in FIG. 5. In FIG. 5, all the litter 45 has passed through the screen 174 and a substantial amount of it has entered the inner compartment 160 while the waste material 82 is resting on top of a surface of the septum 156 which faces toward the center of the rotatable chamber 44. The rotatable chamber 44 is rotated to the dump position shown in FIG. 6 where the waste material 82 falls due to the force of gravity out the side opening 146 of the rotatable chamber 44. Presumably, the waste material 82 will fall directly into the waste storage bag 124 or be directed by the deflector 76 toward the waste storage bag 124. As can be seen, in this position the litter 45 is entirely within the inner compartment 160. At this point the third magnet 192 is sensed by the Hall effect sensor 90, causing the rotation in this first direction to cease.

The motor 56 is then commanded to rotate the rotatable chamber 44 in a second and opposite direction (clockwise as viewed in FIGS. 3-8) to return toward the home position. In doing so, the rotatable chamber 44 is moved to and through the intermediate position shown in FIG. 7. In this position, the rotatable chamber 44 can be seen to be rotating clockwise and thus due to the force of gravity the cat litter 45 is rotating relative to the chamber 44 in a counter-clockwise direction. Due to the pivotal mounting of the screen 174, the screen 174 will be forced to curve so as to ride on top of the pile of litter 45 and thus the litter 45 will not be forced to pass through the screen 174 a second time during the cycle. It can be appreciated that the cat litter 45 has not been dropped from a significant height to the bottom of the rotatable chamber 44 but instead has smoothly slid along the inner surface of the rotatable chamber 44. The rotatable chamber 44 is rotated to the leveling position shown in FIG. 8 at which point the second magnet 190 is sensed by the Hall effect sensor 90. As can be seen, when the rotatable chamber 44 is rotating in the clockwise direction and the litter 45 is rotating relative to the rotatable chamber 44 in the counterclockwise direction, the litter 45 will tend to form in a pile which is offset in a clockwise direction from the bottom of the rotatable chamber 44, due to the friction between the litter 45 and the inner surface of the rotatable chamber 44, among other reasons. Because of this offset during rotation, it is necessary to rotate the rotatable chamber 44 to this leveling position shown in FIG. 8 so that when the rotatable chamber 44 is again rotated in the first direction back to the home position shown in FIG. 3 (due to the sensing by the Hall effect sensor 90 of the first magnet 186), the litter 45 will be level.

It can be appreciated that the device 40 of the present invention includes the following advantages over the prior art. The device 40 effectively limits the unpleasant odors escaping therefrom by placing the waste material 82 in an enclosed portion of the device 40 within the support base 42. The device 40 operates automatically based either on the sensing of a cat in the device 40 or based on programmed time periods. The amount of litter 45 and dust outside the device 40 is greatly reduced by the substantially-enclosed geometry of the chamber 44, the sloped steps 102 and 150, and the smooth movement of the litter 45 during the operational cycle. The device 40 is convenient for the cat and the owner. The device 40 can be surrounded on three sides by walls or furniture, as only the front side need be accessed for entry by the cat and replacement of waste storage bags 124. The rotatable chamber 44 can be easily removed for cleaning.

Figure 23:
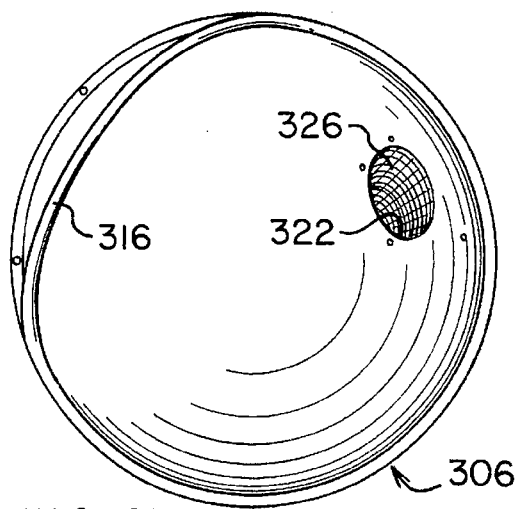
FIG. 23 is a rear view of the rotatable chamber shown in FIG. 16, showing an irregularly-positioned drive track thereon.
Figure 24:
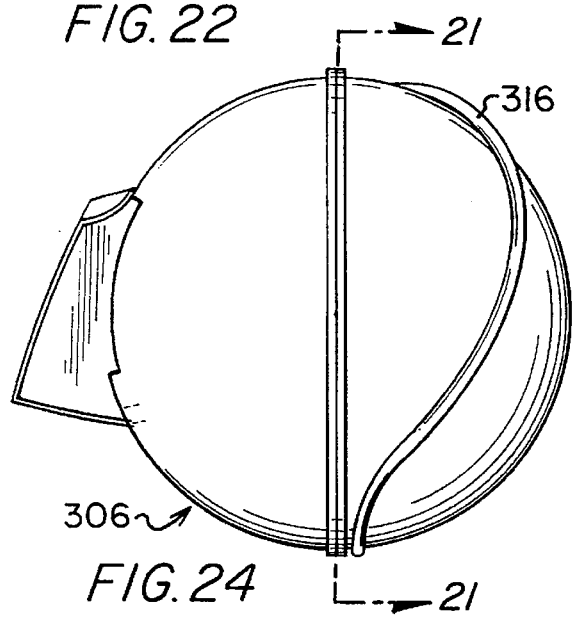
FIG. 24 is a side view of the rotatable chamber shown in FIG. 16, showing a right side thereof.
Figure 25:
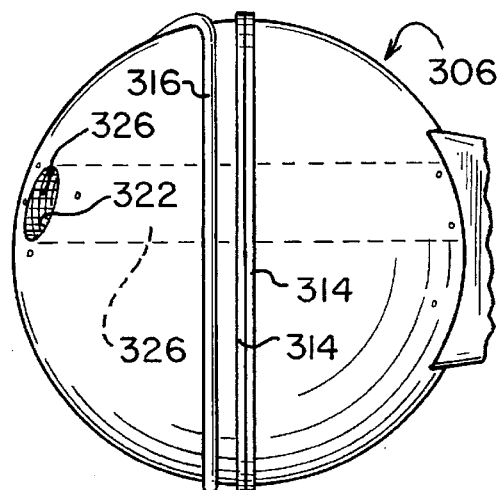
FIG. 25 is a side view of the rotatable chamber shown in FIG. 16, showing a left side thereof.
Figure 26:
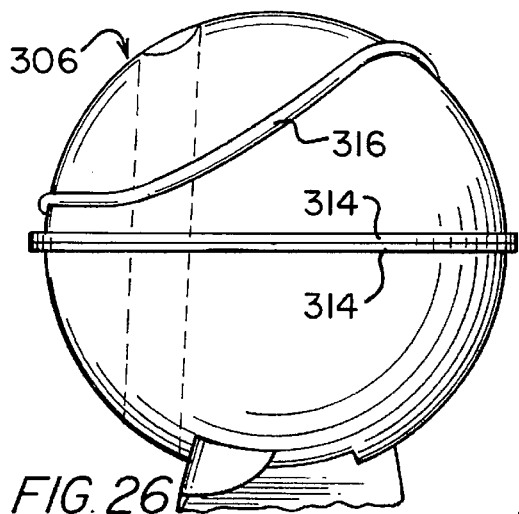
FIG. 26 is a top view of the rotatable chamber shown in FIG. 16.
Figure 27:
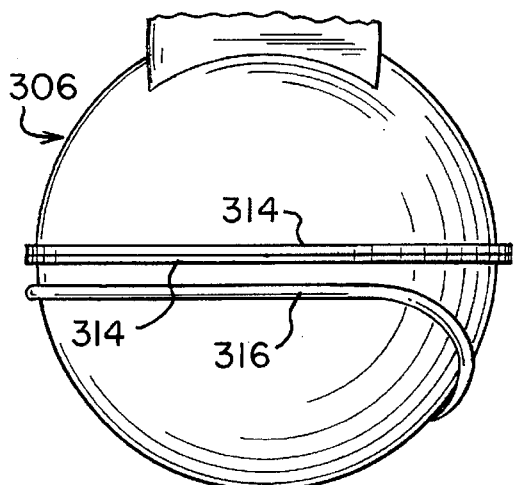
FIG. 27 is a bottom view of the rotatable chamber shown in FIG. 16.
Figure 28:
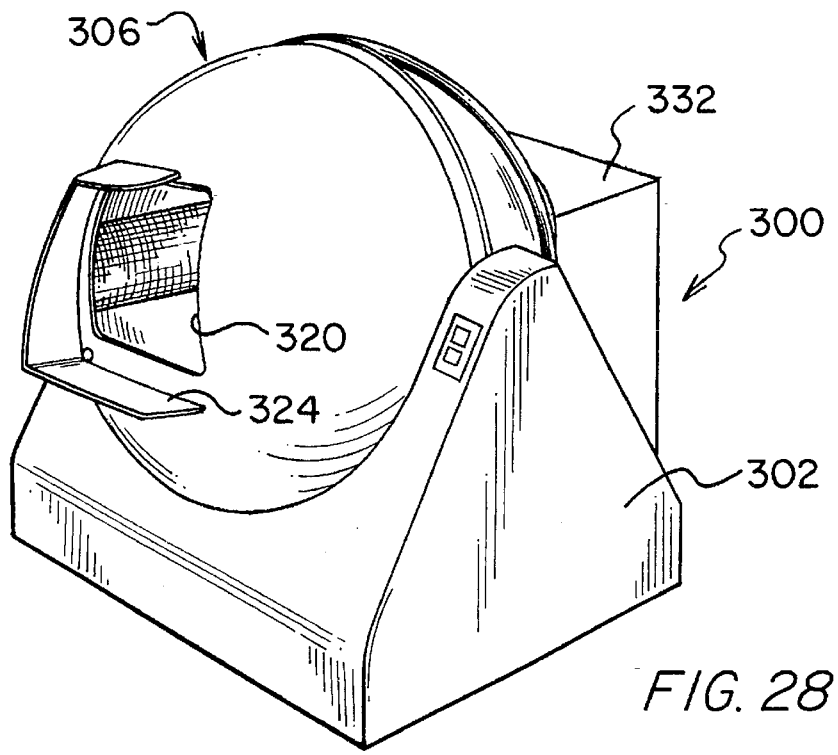
FIG. 28 is an isometric view of the device shown in FIG. 16, with a cosmetic protective shroud installed.

A second embodiment of an automatic kitty litter device 300 is shown in FIGS. 16–30. The entire device 300 is seen in FIG. 1 with a protective shroud 302 in FIG. 28. The device 300 can be seen to include a support base 304 shown in FIG. 17 and a spherical rotating chamber 306 shown in FIGS. 22–27. The spherical chamber 306 is composed of two hemispheres 310 and 312 which are connected together along corresponding flanges 314. A smooth drive belt 316 is provided on the rear hemisphere 312 in an irregular pattern as shown in FIGS. 23–27. FIGS. 22–27 show various views of the spherical rotatable chamber 306 from the six different cardinal viewing directions. It can be appreciated that the chamber 306 has two openings, a front opening 320 on the from hemisphere 310 for ingress and egress of the cat, and a rear opening 322 defined in the rear hemisphere 312 of the chamber 306, for expulsion of the animal waste material. A three-sided step 324 surrounds portions of the front opening 320 as shown in FIG. 23. A screen 326 is provided in the interior of the chamber 306 as shown in FIGS. 20, 21, and 25. The screen 326 can be seen to communicate with the rear opening 322 of the chamber 306. As shown in FIG. 21, the rotatable chamber 306 is rotated in a first direction to remove the waste material from the litter. As the chamber 306 is rotated, the litter passes through the screen 326 and the waste material is caught by the screen 326. The chamber 306 does not rotate about a single rotational axis, however. This is due to the irregular placement of the drive belt 316 on the chamber 306. Since the drive belt 316 takes an irregular path, the chamber 306 rotates about a multitude of axes. This has the effect of rotating the chamber 306 around a first axis until the screen 326 interacts with the litter and then, once the waste material is caught by the screen 326, the chamber 306 is tilted on its side to dump the waste material out the rear opening 322. As shown in FIGS. 17 and 18, a waste receptacle 332 is placed adjacent the rotatable chamber 306 to receive the dumped waste material.

Figure 29:
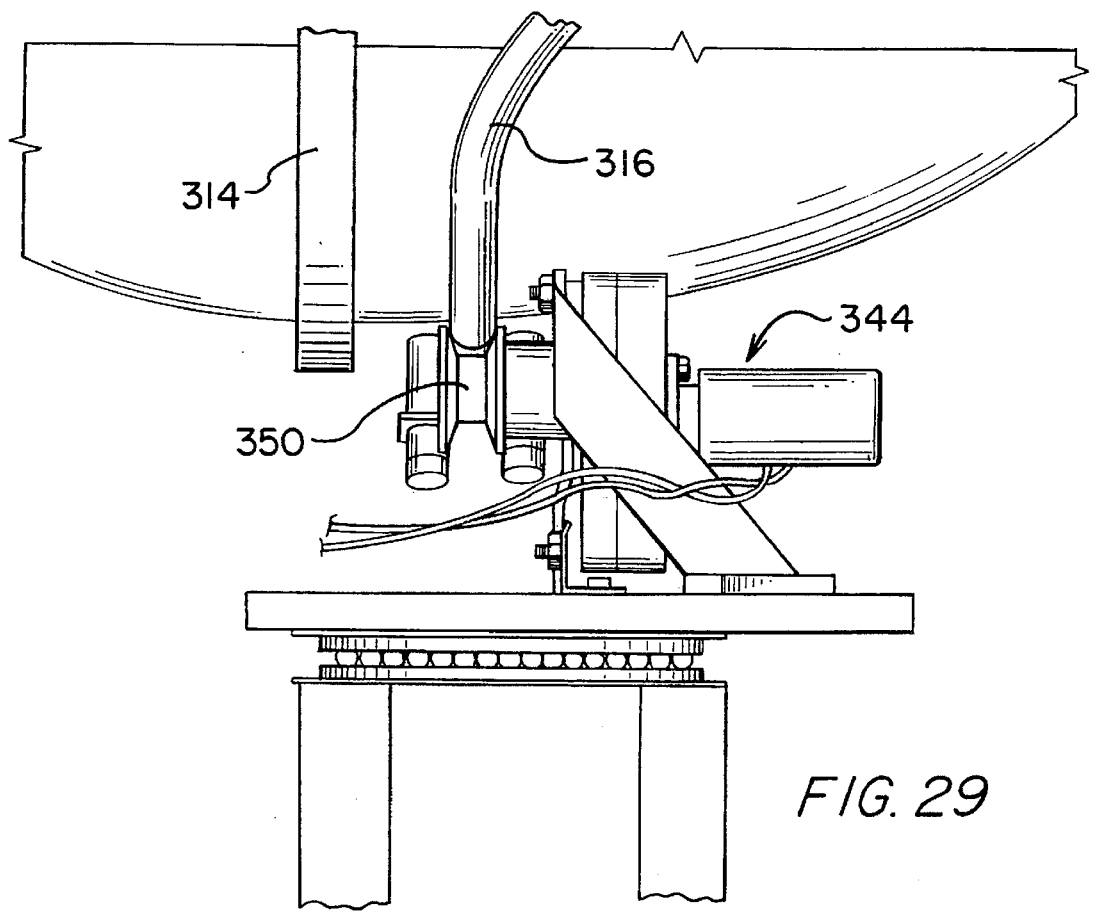
FIG. 29 is a close-up view of a pivotally-mounted motor and its engagement with the drive track of the rotatable chamber of the device shown in FIG. 16.

As best seen in FIG. 17, the support base 304 includes a support frame 334 and a cradle 336 which is pivotally mounted thereon. The cradle 336 includes a plurality of pairs of rollers 340 and guide fingers 342 mounted thereon, as shown in FIG. 19. The rotatable chamber 306 is placed by the operator into the cradle 336 so that the flange 314 rests between each of the pairs of rollers 340 and guide fingers 342. The rollers 340 assist in the rotation of the rotatable chamber 306 while the guide fingers 342 serve to keep the flange 314 of the rotatable chamber 306 aligned with the cradle 336. A motion 344 is pivotally mounted to the support frame 334 as seen in FIGS. 17, 29, and 30. Due to the pivotal mounting of the motor 344, it can pivot to follow the irregularly-positioned drive belt 316. As can be seen in FIG. 29, the motor 344 is positioned in a particular orientation prior to a curve in the drive belt 344 and pivots to a second orientation shown in FIG. 15 after the curve in the drive belt 344. As shown in FIG. 30, the motor 344 includes a pair of guide fingers 346 and a drive wheel 350. A controller 352 (shown in FIG. 17) uses Hall effect sensors and magnets, or alternatively mechanical position switches, to stop the rotation of the chamber 306 at the desired position after a complete revolution has occurred.

Figure 33:
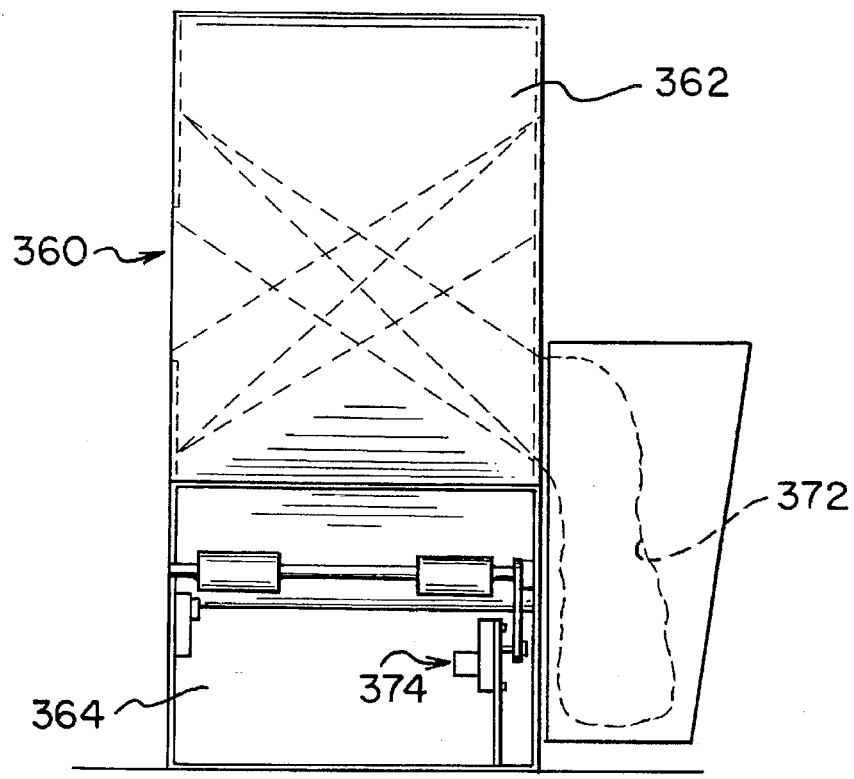
FIG. 33 is a side view of the device shown in FIG. 31.

A third embodiment of an automatic cat litter device 360 is shown in FIGS. 31–33. This embodiment includes a rotating drum 362 placed on a support base 364. The drum 362 has a pair of openings therein, a front opening 366 for ingress and egress of the animal and a rear opening 370 for expulsion of the animal waste material into an animal waste storage bag 372 adjacent thereto. A motor 374 mounted within the support base 364 rotates the rotatable drum 362 so that a screen 376 mounted transversely within the drum 362 is urged against the litter 380 and filters out any clump of animal waste material. As the drum 362 continues to rotate, the slope of the screen 376 causes the waste material to be dumped out of the rear opening 370 when the drum 362 has been rotated through approximately 180°. The drum 362 continues rotating until the litter 380 is in the original home position.

The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The invention claimed is:

1. An apparatus for receiving and disposing of waste material from an animal, comprising:

a rotatable chamber having a first opening defined in an exterior surface thereof, the opening being suitable for ingress and egress of the animal, the chamber being adaptable to receive and substantially retain litter therein, the chamber having a second opening defined in the exterior surface thereof for selective disposal of the waste material therethrough, the chamber further including:

a septum in the interior of the chamber, the septum being attached to the chamber to form an inner compartment within the chamber, the inner compartment having a port to place the inner compartment in fluid communication with the chamber, the second opening being defined in the exterior surface of the chamber at a position adjacent the attachment of the septum to the chamber; and a screen operatively associated with the port to screen out objects, including waste material, greater than a predetermined size from entering the inner compartment;

a support base for supporting the rotatable chamber; and means associated with the rotatable chamber and the support base for automatically rotating the chamber relative to the support base, wherein the means rotates the chamber in a first direction by an amount less than a full rotation to cause the litter to pass through the screen and into the inner compartment and cause the waste material to be caught by the screen and to be expelled downward through the second opening out of the rotatable chamber.

2. An apparatus as defined in claim 1, wherein the screen is pivotally attached at one side thereof to the septum, and wherein the rotating means is further operative to rotate the chamber in an opposite second direction subsequent to the rotation which caused the litter to be placed in the inner compartment, this subsequent opposite rotation causing the litter to slide out of the inner compartment, the pivotal nature of the screen allowing the screen to ride on top of the litter so the litter slides out of the inner compartment with a substantial majority of the litter not passing through the screen.

3. An apparatus as defined in claim 1, wherein the rotatable chamber is in a first position relative to the support base prior to rotation; wherein the chamber is rotated to a second position to expel the waste material, and the subsequent opposite rotation carries the chamber through the first position to a third position for leveling the litter in the chamber prior to again rotating the chamber in the first direction to return the chamber back to the first position.

4. An apparatus as defined in claim 1, wherein the rotatable chamber rotates about a rotational axis and wherein the first opening is defined in the chamber so that the rotational axis passes therethrough.

5. An apparatus as defined in claim 1, wherein the support base has an opening defined therein to receive the waste material expelled from the rotatable chamber.

6. An apparatus as defined in claim 5, wherein the support base is adapted to receive a storage bag and hold the bag in an open position to receive the expelled waste material therein.

7. An apparatus as defined in claim 6, wherein the support base includes a sliding drawer slidably mounted to the support base, the drawer receiving the storage bag.

8. An apparatus as defined in claim 7, wherein the support base further includes means for closing the bag as the drawer is opened and opening the bag as the drawer is closed.

9. An apparatus as defined in claim 1, wherein the rotatable chamber further includes a step attached to the exterior surface thereof adjacent the first opening therein, wherein the step is sloped to cause any litter tracked out of the chamber onto the step to move toward the chamber.

10. An apparatus as defined in claim 1, wherein the support base includes a step formed thereon, the step being sloped to cause any litter tracked out of the chamber onto the step to move toward the chamber, and wherein a return port is defined in the exterior surface of the support base adjacent the step to allow litter to be returned to the interior of the support base.

11. An apparatus as defined in claim 10, further including a cover flap rotatably mounted to the support base adjacent the return port to selectively cover the port.

12. An apparatus as defined in claim 1, wherein the rotatable chamber is received on top of the support base, the support base generally having the shape of an upright cylinder and the chamber generally having the shape of a spheroid, the spheroid being generally spherical with two flattened sides through which the axis of rotation passes, so that the spheroid rests in the opening inherently defined in the top of the upright cylinder.

13. An apparatus as defined in claim 12, further including slidable surfaces having a relatively low coefficient of friction are located along the top of the upright cylinder for the rotatable chamber to slide thereon while rotating, and wherein the rotating means includes a motor mounted inside the support base and a drive track defined on the exterior surface of the rotatable chamber, wherein the motor operatively interacts with the drive track to rotate the chamber.

14. An apparatus as defined in claim 13, wherein the drive track extends along only a portion of the entire circumference of the spherical portion of the chamber, so that the motor can only rotate the chamber around a fraction of a complete rotation.

15. An apparatus as defined in claim 1, wherein the rotating means includes:

a motor operatively associated with the chamber and the support base to cause the chamber to rotate relative to the support base; and a controller in communication with the motor to provide control signals to the motor.

16. An apparatus as defined in claim 15, wherein the controller automatically controls the motor to rotate the chamber on a periodic basis, the length of the periods being selectable by an operator.

17. An apparatus as defined in claim 16, wherein the periods are programmable by selecting the times of day when the controller will rotate the chamber, the times of day being applicable each succeeding day until the selections are changed.

18. An apparatus as defined in claims 15, wherein the rotating means further includes a sensor for sensing the relative position of the chamber to the support base and for supplying a position signal to the controller.

19. An apparatus as defined in claim 18, wherein the controller provides an alarm indication if the controller detects an abnormality in the rotation of the chamber relative to the support base.

20. An apparatus as defined in claim 15, wherein the rotating means further includes a sensor for sensing the presence of an animal in the chamber and for supplying a presence signal to the controller, and wherein the controller automatically controls the motor to rotate the chamber after a predetermined time period following the occurrence of the presence signal.

21. An apparatus as defined in claim 20, wherein the sensor is a motion sensor.

22. A method for removing animal waste material from litter in a rotatable chamber having an inner compartment with a screen attached thereto, a first opening defined therein for ingress and egress of an animal, and a second opening defined therein for expelling the removed waste material from the rotatable chamber, the method comprising the steps of:

rotating the chamber in a first direction a sufficient amount to allow the litter to pass through the screen into the inner compartment and allow the waste material to be expelled from the rotatable chamber through the second opening; and rotating the chamber in a second and opposite direction a sufficient amount to allow the litter to slide out of the inner compartment.

23. An apparatus for receiving and disposing of waste material from an animal, comprising;

a rotatable chamber having a first opening defined in an exterior wall thereof, for ingress and egress of the animal, the chamber being adaptable to receive and substantially retain litter therein, the chamber having a second opening defined in the exterior wall thereof for selective disposal of the waste material therethrough, the chamber including:
- a screen disposed within the chamber and positioned across a portion of the chamber and communicating with the second opening so that waste material caught by the screen can be urged toward the second opening by the force of gravity when the screen is tilted;
- a support base for supporting the rotatable chamber; and
- means associated with the rotatable chamber and the support base for rotating the chamber relative to the support base, the rotation occurring about a plurality of axes wherein the initial rotation Of the chamber is substantially about a first axis and brings the screen into contact with the litter and waste material and subsequent rotation of the chamber is about at least one other axis not parallel with the first axis, the subsequent rotation tilting the screen sufficiently to allow the force of gravity to urge the waste material through the second opening.

24. A method for receiving and disposing of waste material from an animal, comprising the steps of:

receiving the waste material within a chamber including an opening defined in the surface of the chamber and a screen disposed within the chamber; and rotating the chamber about a plurality of axes to catch the waste material with the screen and to direct the waste material toward and out of the opening.

* * * * *

UNITED STATES PATENT AND TRADEMARK OFFICE
CERTIFICATE OF CORRECTION

PATENT NO. : 5,662,066
DATED : September 2, 1997
INVENTOR(S) : Donald D. Reitz

It is certified that error appears in the above-identified patent and that said Letters Patent is hereby corrected as shown below:

In column 10, line 62, change "96" to --196--.

In column 13, line 43, change "from" to --front--.

In column 17, line 16, change "Of" to --of--.

Signed and Sealed this

Sixth Day of January, 1998

Attest:

BRUCE LEHMAN

Attesting Officer

Commissioner of Patents and Trademarks